United States Patent
Shun-Hsing

(10) Patent No.: US 7,821,232 B2
(45) Date of Patent: Oct. 26, 2010

(54) METHOD OF CALCULATING REMAINING CAPACITY OF RECHARGEABLE BATTERY

(75) Inventor: Wang Shun-Hsing, 2F. No. 10, Alley 21, Lane 32, Sec. 1, Wenhua Rd., Banqiao City (TW) 220

(73) Assignee: Wang Shun-Hsing, Banciao (TW)

( * ) Notice: Subject to any disclaimer, the term of this patent is extended or adjusted under 35 U.S.C. 154(b) by 860 days.

(21) Appl. No.: 11/672,093

(22) Filed: Feb. 7, 2007

(65) Prior Publication Data
US 2008/0150489 A1    Jun. 26, 2008

(30) Foreign Application Priority Data
Dec. 26, 2006   (TW) .............................. 95148878 A

(51) Int. Cl.
*H02J 7/00*    (2006.01)

(52) U.S. Cl. ...................... 320/132; 702/63; 324/427; 324/428

(58) Field of Classification Search ................ 320/132; 702/63; 324/427, 428
See application file for complete search history.

(56) References Cited

U.S. PATENT DOCUMENTS

| | | | | |
|---|---|---|---|---|
| 4,595,880 A | * | 6/1986 | Patil | 324/427 |
| 5,650,712 A | * | 7/1997 | Kawai et al. | 324/427 |
| 5,982,152 A | * | 11/1999 | Watanabe et al. | 320/150 |
| 6,011,379 A | * | 1/2000 | Singh et al. | 320/132 |
| 2002/0101243 A1 | * | 8/2002 | Mentgen et al. | 324/427 |
| 2002/0171429 A1 | * | 11/2002 | Ochiai et al. | 324/426 |
| 2006/0176022 A1 | * | 8/2006 | Namba | 320/130 |
| 2006/0202857 A1 | * | 9/2006 | Kawahara et al. | 340/870.02 |
| 2006/0261782 A1 | * | 11/2006 | Kim et al. | 320/132 |

* cited by examiner

*Primary Examiner*—Edward Tso
*Assistant Examiner*—Samuel Berhanu

(57) ABSTRACT

The invention discloses a method for precisely estimating the remaining capacity of a rechargeable battery in a practical system. To evaluate the remaining capacity of a battery through a calibrated current which is calculated from a predictable capacity close to the end of discharge or to the end of full charge, so that the remaining capacity of battery will approach end points smoothly. A system can thus detect battery status and take necessary actions safely. Battery aging problem is considered while calculating the remaining capacity and the full charge capacity (FCC) of battery is also updated according to the total cumulated charges during a charge or discharge stage.

6 Claims, 2 Drawing Sheets

METHOD OF CALCULATING REMAINING CAPACITY OF RECHARGEABLE BATTERY

CROSS REFERENCE TO RELATED APPLICATIONS

This application claims priority of Taiwan Patent Application Serial No. 95148878 entitled "A Method of Calculating Remaining Capacity of Rechargeable Battery," filed on Dec. 26, 2006.

FIELD OF THE INVENTION

The present invention relates to a method for calculating the remaining capacity of a rechargeable battery that adapts to a practical system.

BACKGROUND OF THE INVENTION

A traditional method for estimating the remaining capacity of a rechargeable battery is illustrated as following. FIG. 1 shows a system with a battery as a power source. The system includes an analog-to-digital converting (ADC) unit (2) to detect the voltage, current, and temperature of a battery; a battery unit (1) that provides power to the system; a micro processor unit (3) for processing the detected voltage, current, and temperature of battery (1) to calculate the remaining capacity of the battery; an operation device unit (4) for providing a charge source and a discharge load. The micro processing unit evaluates the remaining capacity of the battery according to the detected voltage (V), current (I) and temperature (T) and outputs the result to the system.

The capacity of a battery is represented by the quantity of electric charge; for example, a battery with capacity of 400 mAh indicates that the battery can discharge a current flow of 4000 milliampere continually for one hour (current*time=quantity of electric charge). The micro processor unit continuously reads the current during charging period (positive current) and discharging period (negative current) to calculate a cumulative input or output quantity of electric charge of the battery a "Coulomb calculation." At a predetermined charging/discharging terminal conditions (e.g. 4.2V as charging terminal condition and 3.0V as discharging terminal condition), the output quantity of electric charge of battery is calculated at a controlled temperature (usually 25 Centigrade) and loading during a full charging/discharging cycle to define the rated (manufacture design) capacity of the battery.

In a practical application, the calculation of the remaining capacity of a battery becomes more complex and difficult due to environment conditions (e.g. load or temperature may change during operation) and chemical characteristics of the battery will decay (e.g. aging problem). Consequently, an inaccurate calculation makes the reminder of battery status less reliable. For example, charging/discharging a battery for a long time causes the aging problem and the residual capacity of the battery is hard to calculate accurately. The chemical characteristics of the battery, which vary with time (i.e. aging) and are affected non-lineraly by the discharging current, voltage, and temperature further increase the difficulty in calculating the remaining capacity. In addition to the Coulomb calculation, compensative methods for calculating the remaining capacity of battery are generally classified into the following two groups:

A. Discharge Condition Lookup Table

A lookup table is prepared based on an experimental simulation of a system to obtain the absolute residual capacity at different discharge currents, voltages, and temperatures. When a real system uses a battery as a power source, then the residual capacity can be obtained from the lookup table based on the measured voltage, current and temperature. The drawbacks of the method are bothersome experiments and the inaccuracy due to aging of the battery which experimental data still does not include.

B. Internal Resistance Calibration

The relationship among the battery internal resistance, the residual capacity, and temperature is determined experimentally beforehand. The system calibrates the residual capacity according to the detected battery internal resistance. Since the internal resistance may reflect the aging problem of the battery, the result is relatively accurate. However, an accurate measurement of the internal resistance is difficult and usually interferes with the charging/discharging process. Further, bothersome experiments need to be done to obtain the data table that corresponds to the relation between the internal resistance and the residual capacity of this type of battery.

On the other hand, for a system requiring less accuracy of remaining capacity, a rough indication is usually implemented, where such as a four level indication, each level represents 25% capacity. In this way, the capacity roughly corresponds to the voltage of battery. For example, a typical lithium battery with 4.2 volt corresponds to 100% capacity while 3.0 volt corresponds to 0% capacity. However, this rough indication still lacks of considerations of the aging problem, and the variation of current or temperature. Therefore, the calculation of the residual capacity using this method includes significant inaccuracy and is inconvenient for practical applications. Accordingly, improved methods of measuring a remaining capacity of a rechargeable battery are desired.

SUMMARY OF THE INVENTION

The following embodiments are described in accordance with the attached drawings to achieve the above-described objects, characteristics, technical solutions and functions.

In accordance with various embodiments of the invention, the voltage (V), current (I), and temperature (T) of a battery are continuously detected from ADC (analog to digital conversion) and a determination is made based on the current (I) to determine whether the battery is in a charging status (larger than a critical positive current), a discharging status (smaller than a critical negative current) or a stand-by status (current approximately zero). When the battery is in the charging status, the remaining capacity of battery, (Qr) is the initial quantity of electric charge (Qc) plus the cumulative quantity of input electric charge (I*dt) during this period (dt). When the battery is charged to approach a cut off criteria, it is determined whether the current is smaller than a calibration-start current, (Istart) and voltage larger than a calibration-start voltage, (Vcstart). If it is true then the capacity is calculated by implementing the calibration current, (Ic) instead of detected current, (I). If the detected current is determined not smaller than the calibration-start current, the capacity is calculated by implementing the detected current, (I). At last, whether the full charge capacity (FCC) should be updated is determined according to the predetermined FCC update criteria.

When the battery is in the discharging status, the remaining capacity, (Qr), is obtained by subtracting the cumulative quantity of output electric charge (I*dt) during the discharging period, (dt) from the initial capacity, (Qi). The detected voltage is determined whether it is smaller than a voltage (Vstart). If it's true, the predict time (To) or assumed remaining capacity (Qo) for decreasing to zero point voltage (Vo) is checked to calculate the calibration current (Ic=Qc/To=Qc/Qo*I). The calibrated remaining capacity Qc=Qc−i−Ic*dt is calculated to approach the zero point capacity during discharging. The remaining capacity of the battery had became zero point capacity when the voltage approached the zero point voltage since the remaining capacity of the battery (Qc) was calibrated continuously based on the discharging zero point voltage.

Because the remaining capacity of the battery is calibrated based on the discharge zero point voltage, the remaining capacity of the battery gradually becomes zero point capacity when the voltage approaches the zero point voltage. This solves the problems in traditional technology that try to calculate absolute residual capacity, which does not correspond to the actual capacity of a practical application, which should equal to zero when at the end of discharging. On the other hand, the full charged capacity is calculated directly according to the Coulomb calculation on the detected current, (I). The absolute battery capacity is not calculated in accordance with the present invention, rather the influence of internal resistance of the battery shows in the calculation of the capacity naturally. Thus, the aging of battery has been taken into consideration in the present invention.

DETAILED DESCRIPTION OF THE INVENTION

Figure 1:
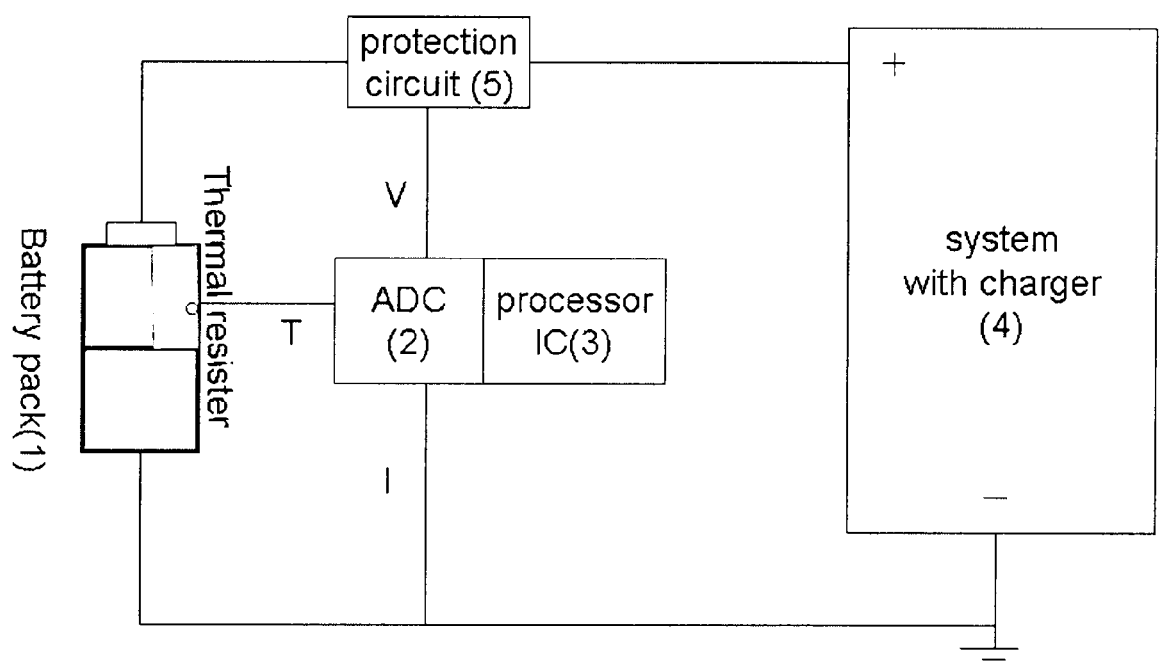
FIG. 1 is a schematic view in accordance with one of embodiments of the present invention.
Figure 2:
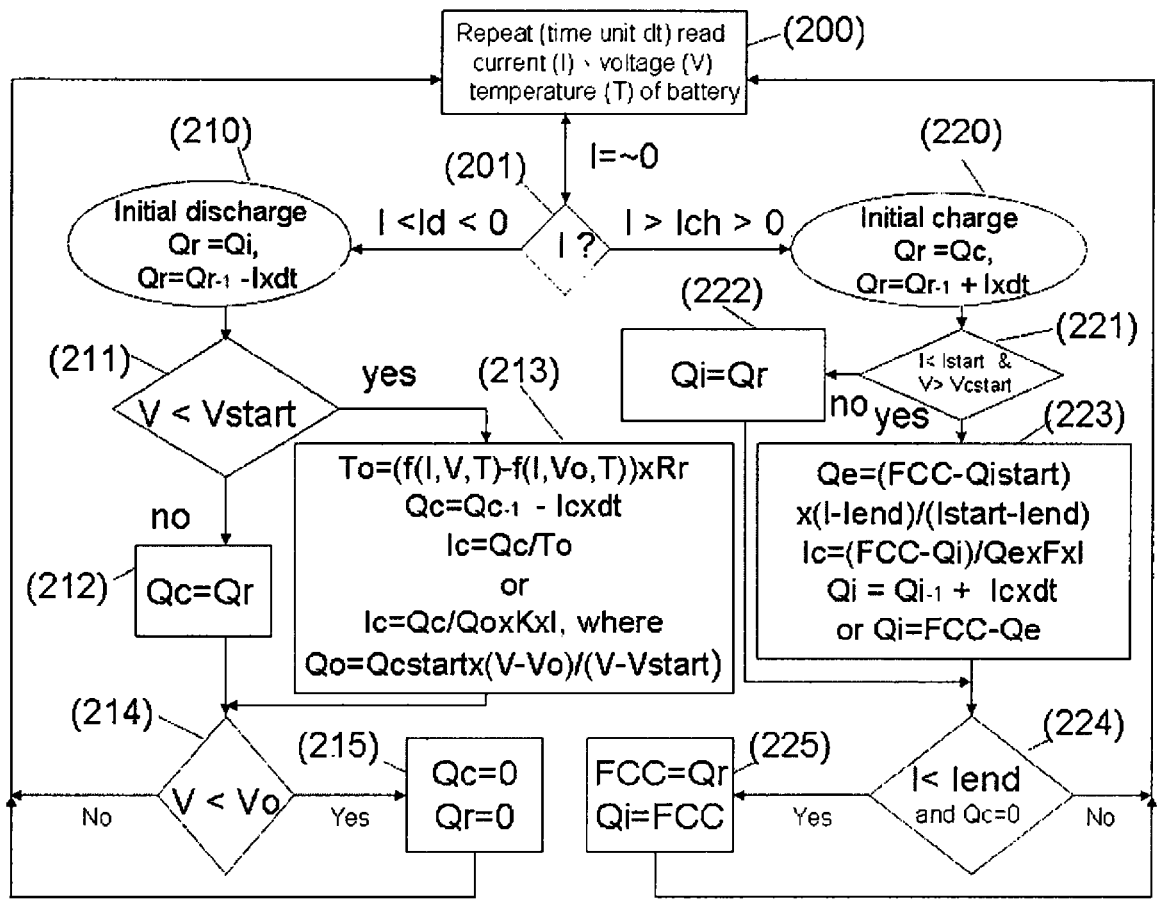
FIG. 2 is a flowchart for calculating the capacity of battery in accordance with the present invention.

Referring to FIG. 2, a method in accordance with the present invention reads continuously, (time unit is dt) the voltage (V), current (I) and temperature (T) of the battery at step (200). At step (201), a determination is made based on the current, (I) to determine whether the battery is in a charging status (larger than a critical positive current) or a discharging status (smaller than a critical negative current). The calculation of capacity is divided into the following two parts under above conditions:

A. Calculating the Battery Capacity During the Charging Process

In step (220) of charging period, the initial quantity of electric charge is set to Qr=Qc. During the charging period, the quantity of electric charge is calculated based on the Coulomb calculation (Qr=Qr−i+I*dt). In step (221), it is determined whether the detected current, (I) is lower than a calibration-start current (Istart) and voltage, (V) larger than a calibration-start voltage, (Vcstart). If the detected current is not lower than a calibration-start current, then the method goes to step (222) to set the capacity Qi to Qr. If the determination is true, then the method goes to step (223) to set the calibration current Ic=(FCC−Qi)/Qe*I*F, wherein Qe=(I−Iend)/(Istart−Iend)*(FCC-Qistart). Where Iend represents a cut off current for determining a charging termination, Istart represents a current value when will the calibration starts, and the capacity is Qistart at that time. F is a adjustable parameter (1/F=Aa*(I−Iend)/(Istart−Iend)+Bb, where Aa,Bb<=1) to fulfill the real condition, FCC is the full charge capacity of battery. In this stage, the capacity is calculated by Qi=Qi−i+Ic*dt or alternatively Qi=FCC−Qe, so that Qi gradually approaches to FCC at the terminal stage. In step (224), it is determined whether a predetermined termination condition is reached. If the predetermined termination condition is reached, the full charge capacity (FCC) is updated in step (225) with the following conditions:

a: The cumulative electric charge falls within a positive/negative tolerance of the full charge capacity (FCC).

b: The input electric charge is obtained by cumulating, beginning from the zero point capacity or the deep of discharge rate (DOD=(output electric charge)/FCC, within 0% to 100%) of previous discharged stage above a preset-parameter.

If the above conditions are fulfilled, the input electric charge Qr calculated by cumulating is updated as a new full charge capacity (FCC) for the battery. If the above conditions are not fulfilled then the method goes back to step (200) to get new current (I), voltage (V) and temperature (T) of battery. In step (201), it is determined again whether the battery enters a charging, discharging or stand-by status according to the new current value.

B. Calculating the Battery Capacity During the Discharging Process

In step (210) of discharging period, the initial capacity is set to Qr=Qi. During the discharging period, the input capacity is calculated by the Coulomb calculation (Qr=Qr−i−I*dt). In step (211), it is determined whether the voltage is lower than a certain voltage value (Vstart). If the voltage is not lower than Vstart, then the method goes into step (212) to set the remaining capacity Qc to Qr. If the voltage is lower than Vstart, then the method goes into step (213) to re-calculate the capacity Qc by the following steps.

An experimental table of cut off time Te=f(I,V,T) built base on this battery beforehand at various discharging current (I), voltage (V), and temperature (T) wherein T represents the temperature of battery, V represents the voltage of battery, I represents the current of battery and the cut off time (Te) represents the required time for the battery declining from voltage (V) to the cut off voltage (Ve) at same I and T.

During a small time period (dt) in the discharging period, a predictable end of time To=f(I,V,T)−f(I,Vo,T) to zero point voltage (Vo) instead of the cut off voltage (Ve) is obtained by interpolating from the experimental table. The remaining charge base on zero point is estimated by Qo=I*To*Rr, wherein Rr represents the calibration factor for calibrating the inaccuracy. The calibrated discharging current Ic=Qc/To is obtained based on To and remaining capacity Qc=Qc−i−Ic*dt. In this way, the capacity Qc can be calculated at any time from the discharging voltage (Vstart) to zero point voltage (Vo). In step (213), the starting value of Qc corresponds to the capacity Qcstart, where the voltage is Vstart and begin calibration. Alternatively, Ic=Qc/Qo*I and the predictable capacity Qo=Qcstart*(V−Vo)/(Vstart−Vo)*K is also applicable to get a remaining capacity Qc=Qc−i−Ic*dt, wherein V represents the discharging voltage of battery at that moment. K is an adjustable parameter (K=Cc*(V−Vo)/(Vstart−Vo)+Dd, where Cc,Dd<=1). The remaining capacity of the battery gradually becomes zero point capacity when the discharging voltage approaches zero point voltage (Vo). In step (214), it is determined whether the detected voltage is lower than the predetermined zero point voltage (Vo). If the detected voltage is lower than the predetermined zero point voltage, then the method goes into step (215) to set Qr and Qc to a value, e.g. zero in this embodiment. Meanwhile, if the battery is discharged from a full capacity state to the discharging zero point voltage and the cumulative electric charge compared with the full charge capacity (FCC) is within a certain tolerance, it is updated as the new FCC. If the detected voltage is not lower than the predetermined zero point voltage, the method goes back to step (200) to get new current (I), voltage (V) and temperature (T) of battery. In step (201), it is determined whether the battery enters into a charging, discharging or stand-by status according to the new current value.

Based on the above descriptions, the calculation of remaining capacity of battery closes to full charge or end of discharge ranges are based on the calibrated current, (Ic) instead of detected current, (I) and the calibrated current Ic is calculated based on I and the predictable remaining capacity, (Qx) which depends on voltage (V), current (I), and temperature (T) of battery and will approach one constant (C) when battery closes to charge/discharge end of conditions, so the remaining capacity of battery is calculated by Qn=Qn−i+Ic*dt during the ranges will also approach the constant (C) when the process continues.

The spirit and scope of the present invention can be clearly understood by the above detailed descriptions of the preferred embodiments. The embodiments are not intended to limit the scope of the invention. Contrarily, various modifications of the illustrative embodiments, as well as other embodiments of the invention, will be apparent to persons skilled in the art upon reference to this description. It is therefore contemplated that the appended claims will cover any such modifications or embodiments as falling within the true scope of the invention.

What is claimed is:

1. A method of calculating remaining capacity of a rechargeable battery, comprising:
   providing a system for accomplishing the following steps, the system including a microprocessor unit that reads current, voltage and calculates remaining capacity of battery;
   during a charging process, determining a remaining capacity of battery Qi beginning from setting an initial capacity Qc to a starting capacity then calculating a cumulative quantity of electric charge of the battery based on Coulomb's calculation (Qi=Qc+ΣI*dt);
   during near full terminal stage of the charging process, setting a calibration current, (Ic) instead of the charge current, (I), (Ic=(FCC−Qi)/Qe*F*I), wherein Qe=(I−Iend)/(Istart−Iend)*(FCC−Qistart) represents the predicted capacity difference in FCC, and Iend represents a cut off current for determining a charging termination, Istart and Vcstart represent a starting current and voltage respectively when the calibration starts, and capacity is Qistart at that time, F is an adjustable parameter (1/F=Aa*(I−Iend)/(Istart−Iend)+Bb, wherein Aa,Bb<=1), FCC is a full charge capacity of the battery; and
   calculating, using the microprocessor unit, the remaining capacity by Qi=Qi−1+Ic*dt or alternatively by Qi=FCC−Qe, so that Qi approaches FCC at the full charge terminal stage, wherein Qi−1 represents the remaining capacity before a time interval dt pass.

2. A method of calculating remaining capacity of a rechargeable battery, comprising:
   providing a system for accomplishing the following steps, the system including a microprocessor unit that reads current, voltage and calculates remaining capacity of battery;
   during a discharging process, calculating a remaining electric charge based on Coulomb calculation (Qc=Qi−ΣI*dt) according to a discharging current (I) detected at any time in the discharging process, wherein Qi represents an initial capacity;
   at near empty discharging terminal stage, starting a calibration process as a detected voltage, (V) lower than a predetermined voltage (Vstart), wherein an experimental table of cut off time Te=f(I,V,T) represents a time required from voltage (V) declining to cut off voltage (Ve) at discharging current (I) and temperature (T) is prepared;
   during a small time period (dt), obtaining a predictable end of time To=(f(I,V,T)−f(I,Vo,T))*Rr, for declining to a zero point voltage (Vo) instead of the cut off voltage (Ve) by interpolating from the experimental table, wherein Rr represents a calibration parameter and f(I,Vo,T) represents a required time form zero point voltage (Vo) discharging to the cut off voltage (Ve) at same I and T, then a predicted remaining capacity based on zero point capacity is Qo=I*To, where Vo>=Ve and Te>=To and a calibrated discharging current is obtained Ic=Qc/To=Qc/Qo*I, wherein Qo is the predicted remaining capacity based on zero point capacity; and
   calculating, using the microprocessor unit, a remaining capacity Qc as Qc=Qc−1−Ic*dt at any time from the Vstart to Vo during discharging, wherein Qc−1 represents the remaining capacity before a time interval dt pass.

3. A method of calculating remaining capacity of a rechargeable battery, comprising:
   providing a system for accomplishing the following steps, the system including a microprocessor unit that reads current, voltage and calculates remaining capacity of battery;
   during a discharging process, calculating a remaining quantity of electric charge by Coulomb calculation (Qc=Qi−ΣI*dt) according to a discharging current (I) detected at any time in the discharging process, Qi being an initial discharging capacity value;
   at near an empty discharge terminal stage, determining whether a detected voltage, (V) is lower than a predetermined value (Vstart) for entering a calibration process, and setting Ic=Qc/Qo*K*I, wherein Qc represents the remaining capacity and Qo represents a predictive capacity, and wherein Qo=Qcstart*(V−Vo)/(Vstart−Vo), and Qcstart represents a capacity when the declined voltage equals Vstart, Vo represents a zero point voltage, and V represents a discharging voltage of battery at that moment, and K is a adjustable parameter (K=Cc*(V−Vo)/(Vstart−Vo)+Dd, where Cc,Dd<=1); and
   calculating, using the microprocessor unit, a remaining capacity of battery Qc by Qc=Qc−1−Ic*dt at any time from the Vstart to Vo during discharging, wherein Qc−1 represents the remaining capacity before a time interval dt pass.

4. The method according to claim 1, wherein the cut off current (Iend) is adjustable dynamically, and if a predetermined termination condition is reached, the full charge capacity (FCC) is updated with following conditions:
   A) total cumulative electric charge being within a positive/negative tolerance of the full charge capacity; and
   B) an input electric charge being obtained by cumulating starts from a zero point capacity or a deep of discharge rate (DOD=(output electric charge)/FCC, within 0% (no discharge happened) to 100% (fully discharge)) of a previously discharged stage above one preset-parameter.

5. The method according to claim 2, wherein the zero point voltage (Vo) is adjustable dynamically, and if the battery is discharged from a full capacity state to the zero point voltage and a cumulative output electric charge compared with full charge capacity (FCC) is within a predefined tolerance, then FCC is updated with cumulated electric charge during the discharging process (FCC=ΣI*dt).

6. The method according to claim 3, wherein the zero point voltage (Vo) is adjustable dynamically, and if the battery is discharged from a full capacity state to a the zero point voltage and a cumulative output electric charge compared with full charge capacity (FCC) is within a predefined tolerance, then FCC is updated with cumulated electric charge during the discharging process (FCC=ΣI*dt).

* * * * *